United States Patent [19]

Cave et al.

[11] Patent Number: 5,941,598
[45] Date of Patent: *Aug. 24, 1999

[54] DRIVE MECHANISM FOR AN AUTOMOTIVE VEHICLE SUNROOF ASSEMBLY

[75] Inventors: Mark A. Cave, Allen Park; Robert J. Boutin, Madison Heights, both of Mich.

[73] Assignee: ASC Incorporated, Southgate, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/991,835

[22] Filed: Dec. 16, 1997

Related U.S. Application Data

[60] Division of application No. 08/473,351, Jun. 7, 1995, Pat. No. 5,746,475, and a continuation-in-part of application No. PCT/US94/07716, Jul. 5, 1994.

[51] Int. Cl.⁶ ...................................................... B60J 7/00
[52] U.S. Cl. ...................... 296/213; 296/216.08; 296/223
[58] Field of Search ............................. 296/213, 216.01, 296/216.07, 216.08, 223

[56] References Cited

U.S. PATENT DOCUMENTS

| | | | |
|---|---|---|---|
| 4,185,868 | 1/1980 | Kaltz et al. | 296/222 |
| 4,243,261 | 1/1981 | Trenkler | 296/213 |
| 4,420,184 | 12/1983 | Kaltz | 296/221 |
| 4,537,442 | 8/1985 | Jardin | 296/221 |
| 4,556,835 | 12/1985 | Vogel et al. | 318/663 |
| 4,566,730 | 1/1986 | Knabe et al. | 296/221 |
| 4,601,091 | 7/1986 | Grimm et al. | 296/221 X |
| 4,601,512 | 7/1986 | Boots | 296/221 |
| 4,619,480 | 10/1986 | Motoyama et al. | 296/217 |
| 4,626,023 | 12/1986 | Lutz | 296/211 X |
| 4,630,860 | 12/1986 | Fuerst et al. | 296/217 |
| 4,643,478 | 2/1987 | Boots | 296/223 |
| 4,647,106 | 3/1987 | Furst | 296/223 |

(List continued on next page.)

FOREIGN PATENT DOCUMENTS

| | | | |
|---|---|---|---|
| 0 290 106 | 11/1988 | European Pat. Off. . | |
| 1257321 | 2/1961 | France . | |
| 2 234 852 | 1/1972 | Germany | 296/222 |
| 2 318 391 | 10/1974 | Germany . | |
| 19 46 161 | 1/1978 | Germany . | |
| 36 03 314 A1 | 8/1987 | Germany | 296/222 |
| 38 02 379 A1 | 8/1988 | Germany . | |
| 38 22 258A1 | 3/1989 | Germany . | |
| 38 13 049 A1 | 11/1989 | Germany | 296/222 |
| 38 40 119 A1 | 5/1990 | Germany | 296/224 |
| 39 00 361 A1 | 7/1990 | Germany | 296/221 |
| 41 24 505 A1 | 10/1992 | Germany . | |
| 4214277 | 11/1992 | Germany | 296/213 |
| 58-218423 | 12/1983 | Japan . | |
| 3197232 | 8/1991 | Japan . | |
| 404212622 | 8/1992 | Japan | 296/216.01 |
| 5-24437 | 2/1993 | Japan . | |
| 2 047 636 | 12/1980 | United Kingdom | 296/222 |
| 2 077 461 | 12/1981 | United Kingdom | 296/221 |
| WO 94/25301 | 11/1994 | WIPO . | |
| WO 96/01192 | 1/1996 | WIPO . | |

OTHER PUBLICATIONS

"Ford 1973 Car Shop Manual", vol. 4 Body, Ford Marketing Corporation, pp. 46–10–01 through 46–10–8, 46–11–01 through 46–11–07.

"Saab Owners Workshop Manual", Haynese Publishing Group, 1981, 1986, 3 pages.

Drawing of ASC Sunroof (housing assembly)—Complete (750), Part No. C–49X5–0001–AXXX, (prior to Jun. 1995).

*Primary Examiner*—Dennis H. Pedder
*Attorney, Agent, or Firm*—Harness, Dickey & Pierce, P.L.C.

[57] ABSTRACT

A drive mechanism for an automotive vehicle sunroof assembly employs a moving cam and a stationary cam, both of which are engaged by a sunroof pane supporting carriage with cam followers. The specific camming surfaces cause the carriage and pane to move between closed, vent and open position. A method of operating a sunroof assembly is also disclosed.

19 Claims, 13 Drawing Sheets

U.S. PATENT DOCUMENTS

| | | | |
|---|---|---|---|
| 4,650,243 | 3/1987 | Hanley et al. | 296/221 |
| 4,664,439 | 5/1987 | Schaetzler et al. | 296/213 |
| 4,671,564 | 6/1987 | Sumida et al. | 296/214 |
| 4,671,565 | 6/1987 | Grimm et al. | 296/213 X |
| 4,679,846 | 7/1987 | Lux et al. | 296/214 |
| 4,684,169 | 8/1987 | Igel et al. | 296/221 |
| 4,699,421 | 10/1987 | Schaetzler et al. | 296/221 |
| 4,709,959 | 12/1987 | Paerisch et al. | 296/217 |
| 4,746,165 | 5/1988 | Fuerst et al. | 296/223 X |
| 4,749,227 | 6/1988 | Bienert et al. | 296/221 |
| 4,786,102 | 11/1988 | Sakamoto et al. | 296/218 X |
| 4,811,985 | 3/1989 | Kruger et al. | 296/214 |
| 4,844,532 | 7/1989 | Ono et al. | 296/213 |
| 4,852,938 | 8/1989 | Hirshberg et al. | 296/214 |
| 4,869,548 | 9/1989 | Nagata et al. | 296/221 |
| 4,883,311 | 11/1989 | Kohlpaintner et al. | 296/213 |
| 4,910,445 | 3/1990 | Borrmann | 318/468 |
| 4,911,496 | 3/1990 | Fuerst | 296/214 X |
| 4,923,246 | 5/1990 | Takahashi et al. | 296/221 |
| 4,941,706 | 7/1990 | Jardin | 296/213 |
| 4,946,225 | 8/1990 | Jardin | 296/213 |
| 4,978,165 | 12/1990 | Schreiter et al. | 296/214 X |
| 4,982,995 | 1/1991 | Takahashi et al. | 296/221 |
| 4,995,665 | 2/1991 | Ichinose et al. | 296/213 |
| 5,018,783 | 5/1991 | Chamings et al. | 296/219 |
| 5,026,113 | 6/1991 | DiCarlo et al. | 296/221 |
| 5,029,937 | 7/1991 | Yamamoto | 296/223 |
| 5,044,222 | 9/1991 | Tanaka et al. | 74/89.15 X |
| 5,069,500 | 12/1991 | Reihl et al. | 296/214 |
| 5,069,501 | 12/1991 | Baldwin et al. | 296/223 |
| 5,085,622 | 2/1992 | Kohlpaintner et al. | 296/222 |
| 5,090,767 | 2/1992 | Schreiter et al. | 290/217 X |
| 5,104,178 | 4/1992 | Bienert | 296/213 |
| 5,141,283 | 8/1992 | Omoto et al. | 296/219 |
| 5,154,482 | 10/1992 | Hayashi et al. | 296/223 |
| 5,184,870 | 2/1993 | Bauhof | 296/223 |
| 5,197,779 | 3/1993 | Mizuno | 296/222 X |
| 5,248,278 | 9/1993 | Fuerst et al. | 454/129 |
| 5,250,882 | 10/1993 | Odoi et al. | 318/467 |
| 5,261,722 | 11/1993 | Staley et al. | 296/211 |
| 5,288,125 | 2/1994 | Huyer | 296/223 X |
| 5,332,282 | 7/1994 | Magda et al. | 296/213 |
| 5,405,185 | 4/1995 | Cheron et al. | 296/223 |
| 5,447,355 | 9/1995 | Kelm | 296/223 |
| 5,466,038 | 11/1995 | Fujig et al. | 296/213 |
| 5,516,187 | 5/1996 | Zani et al. | 296/223 |

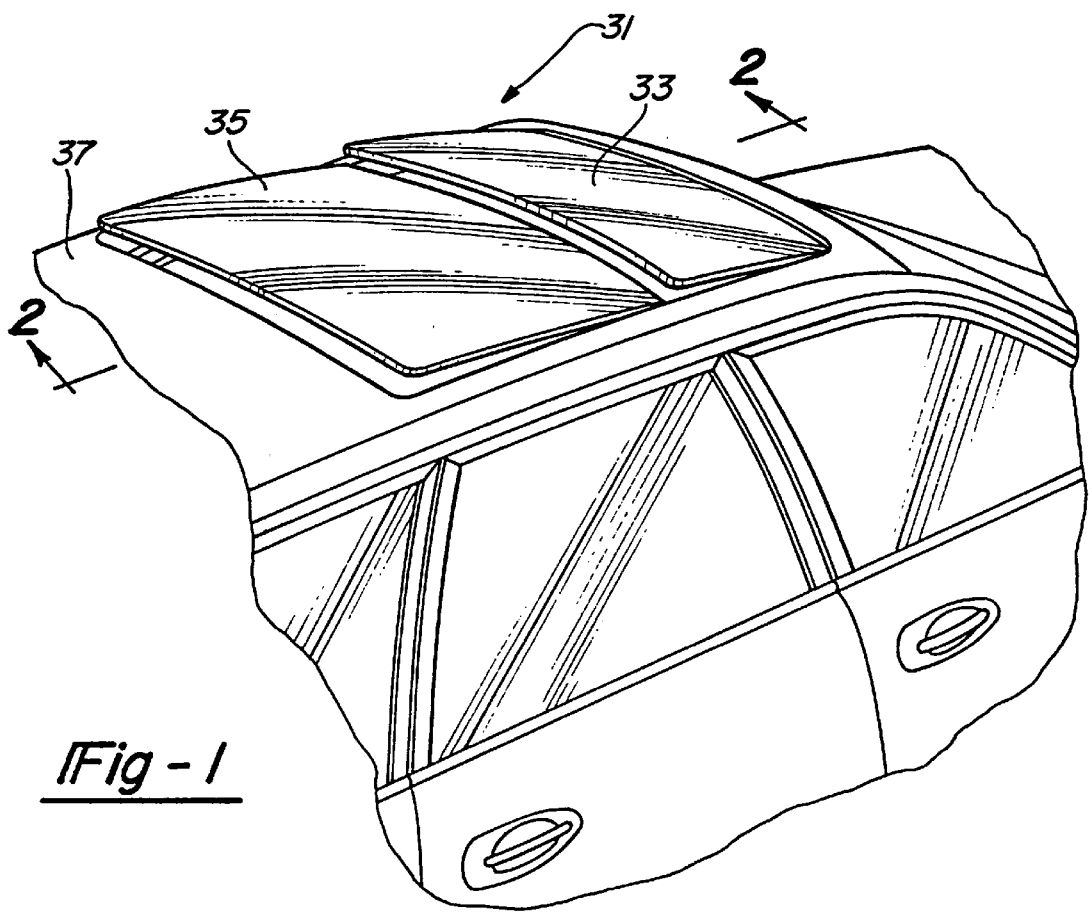
_Fig - 1_
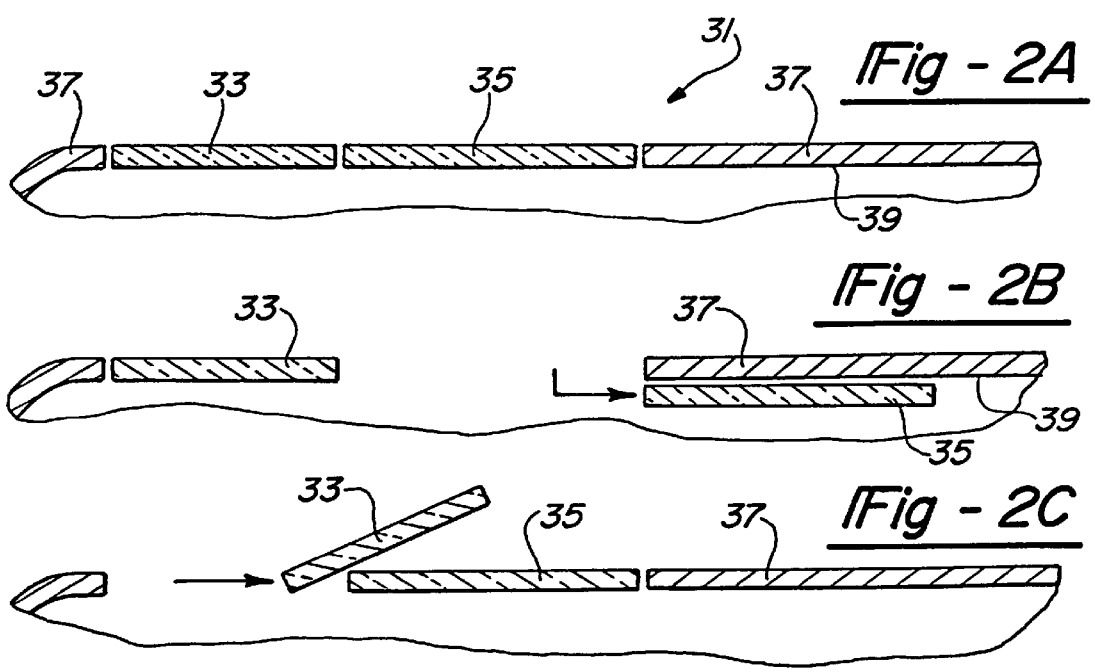
_Fig - 2A_
_Fig - 2B_
_Fig - 2C_

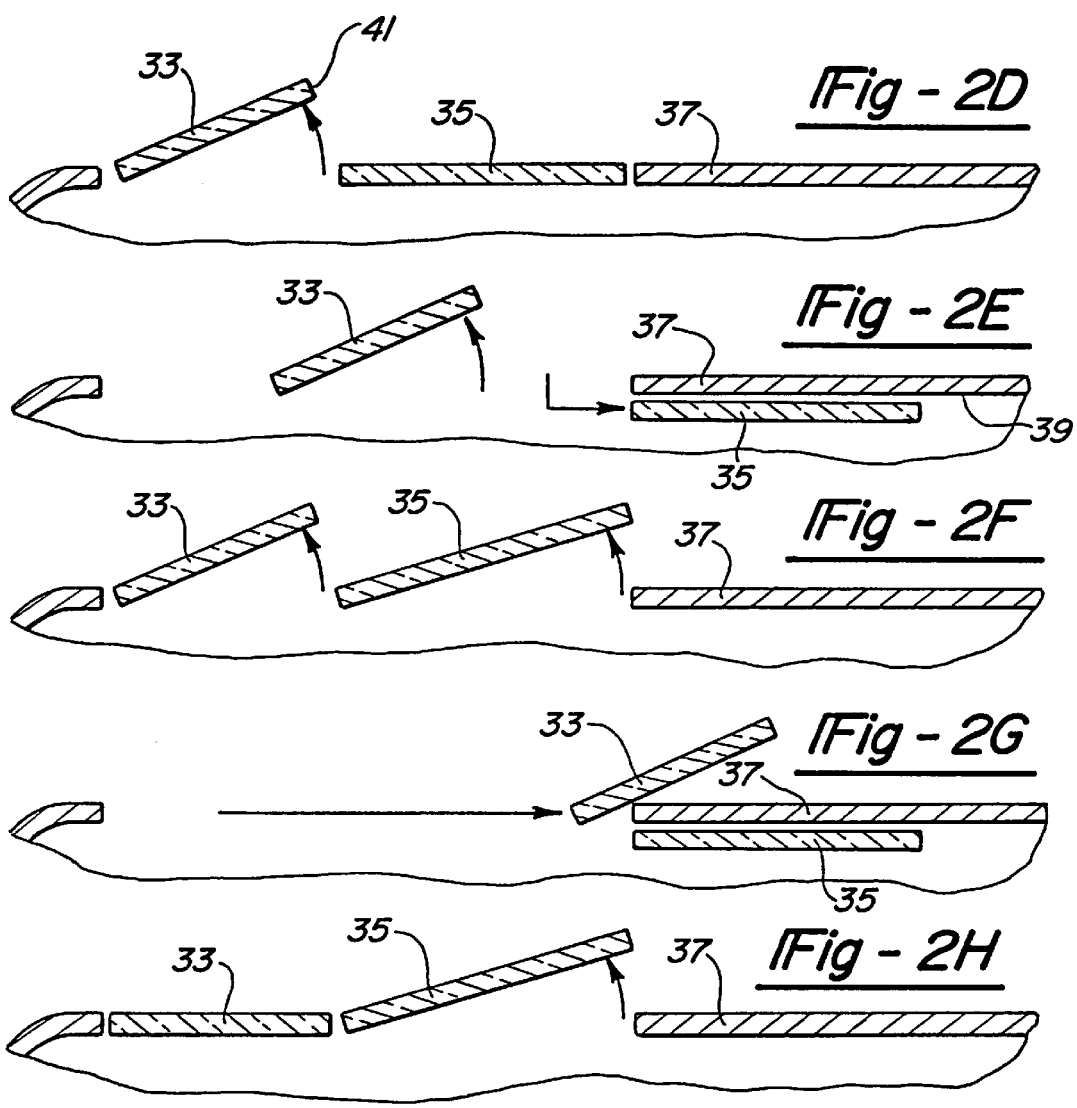

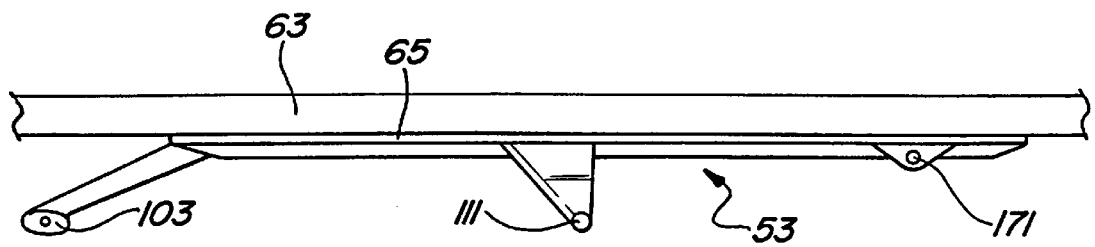
_Fig - 6_
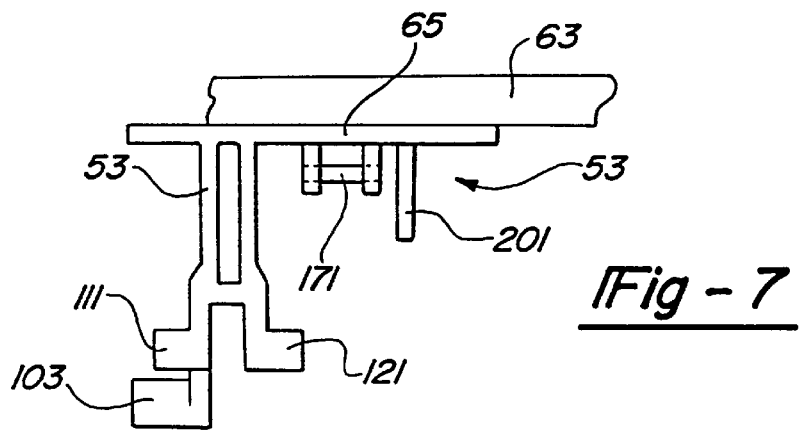
_Fig - 7_
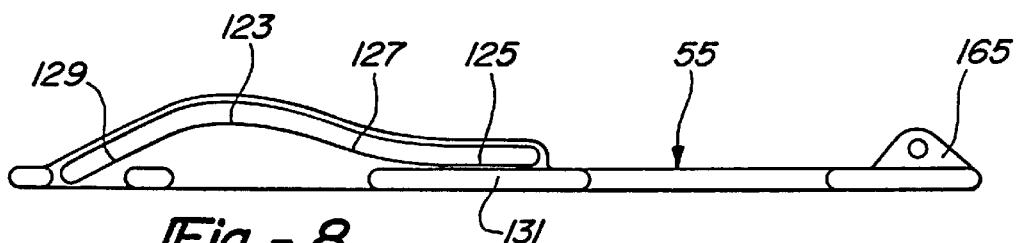
_Fig - 8_
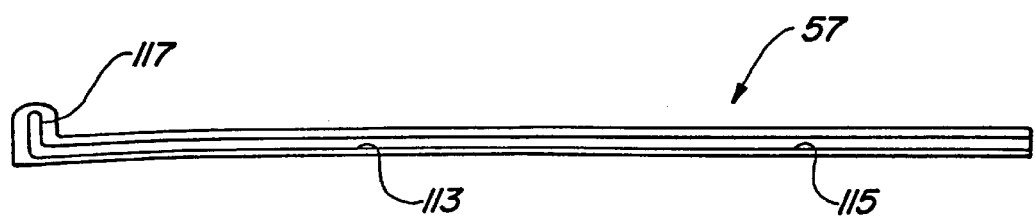
_Fig - 9_

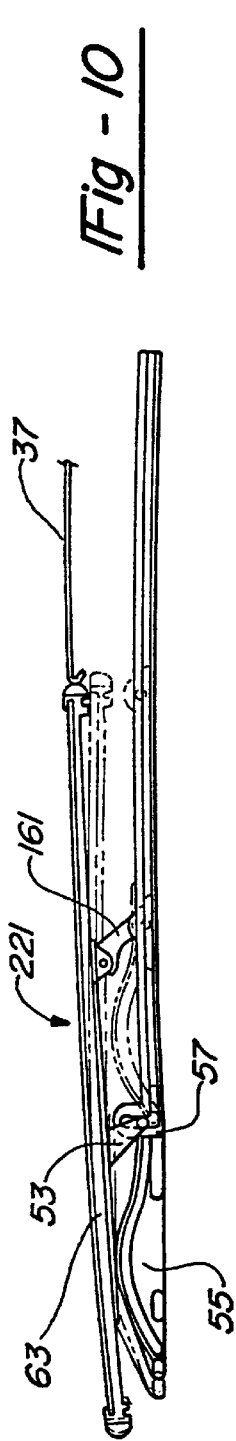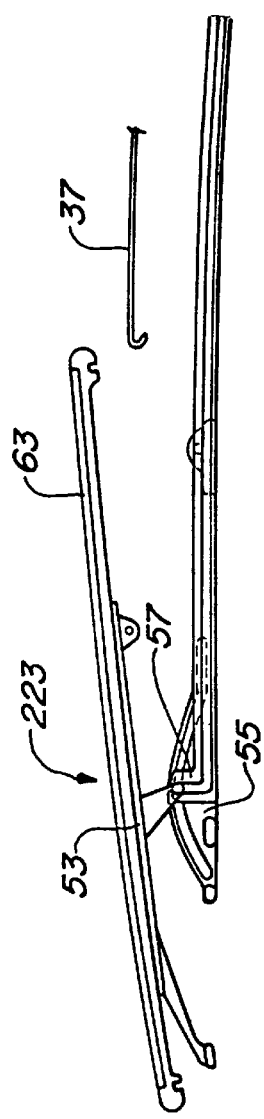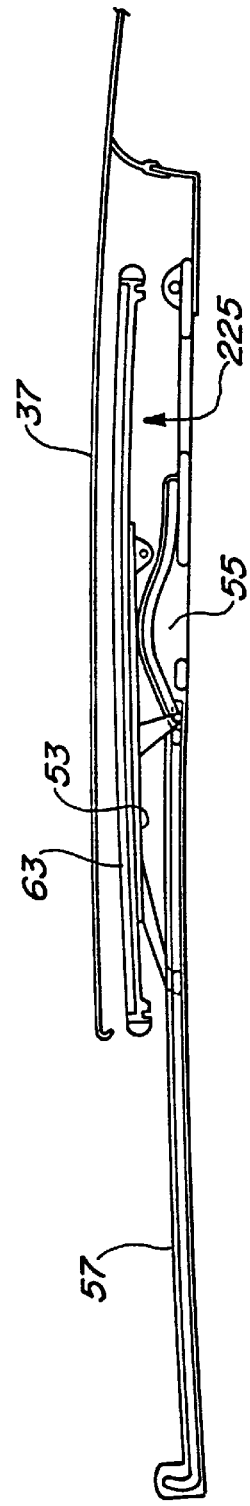

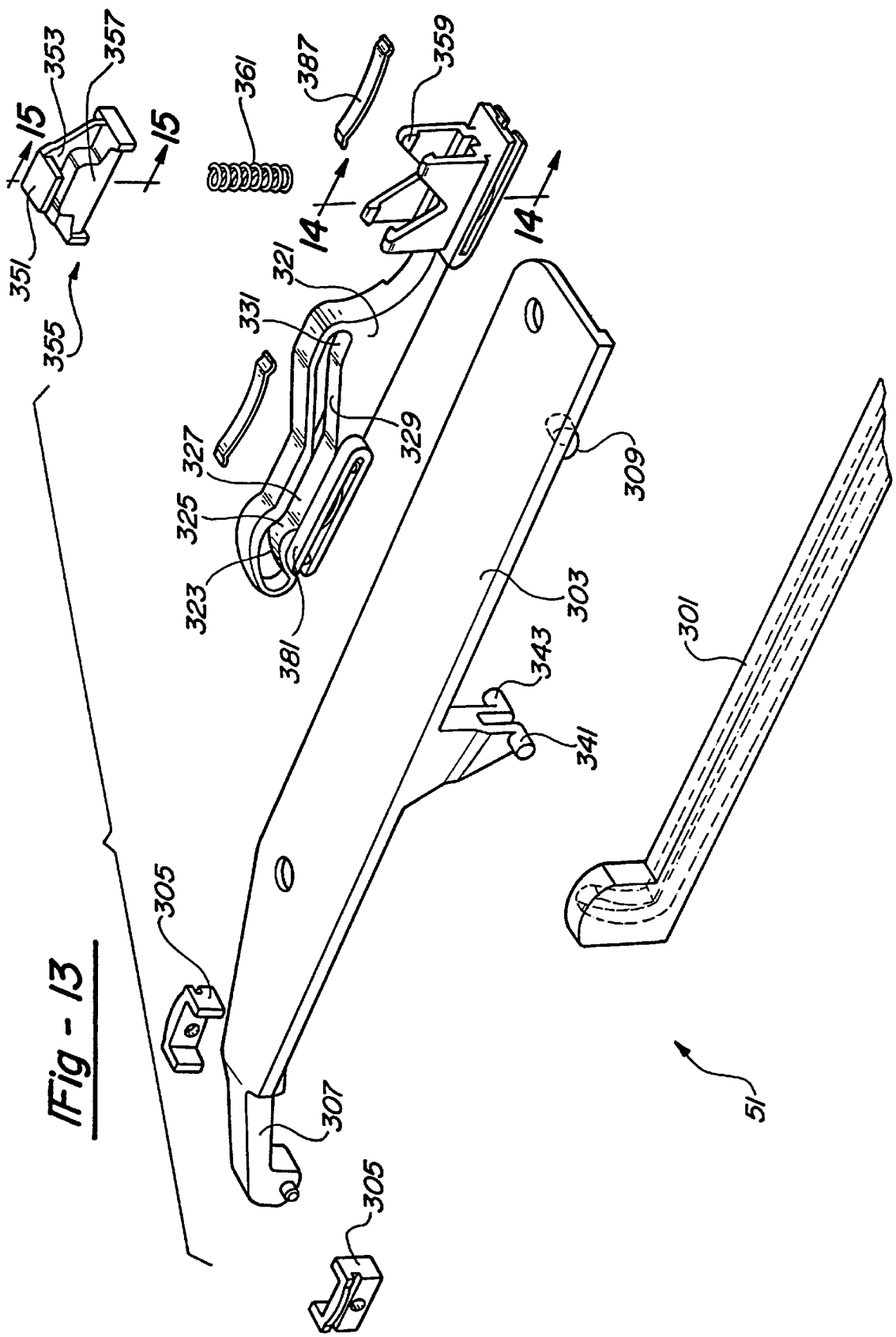

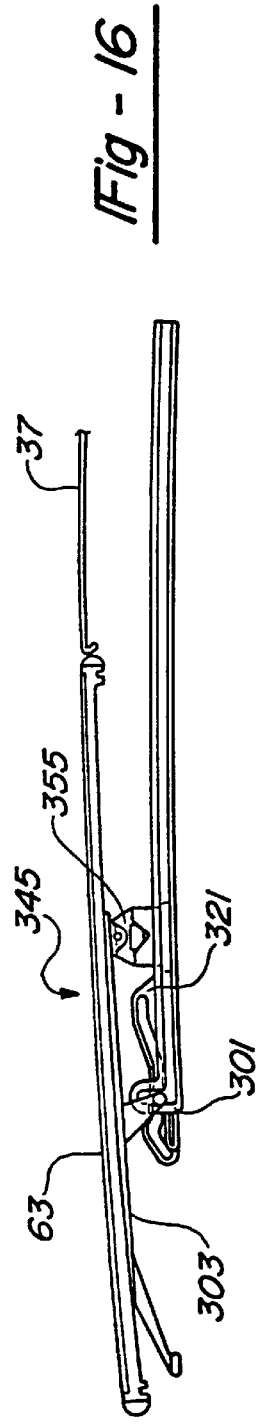
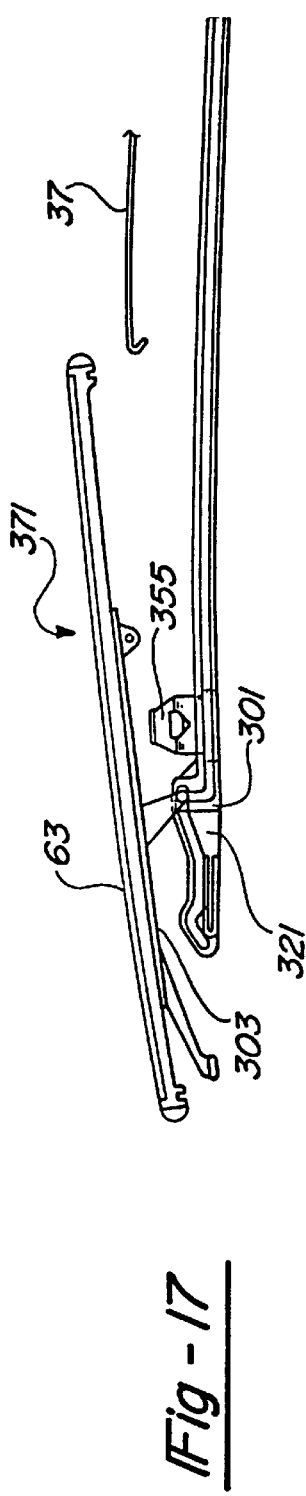
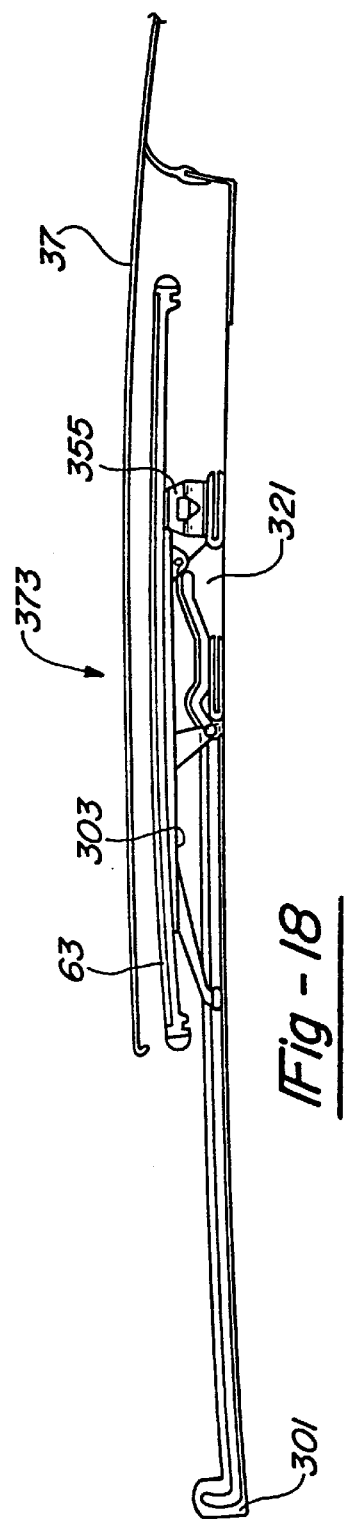

DRIVE MECHANISM FOR AN AUTOMOTIVE VEHICLE SUNROOF ASSEMBLY

This is a divisional of U.S. patent application Ser. No. 08/473,351, filed Jun. 7, 1995 now U.S. Pat. No. 5,746,475.

CROSS REFERENCE TO RELATED APPLICATIONS

This application is also a Continuation-In-Part of PCT patent application Ser. No. PCT/US94/07716 filed on Jul. 5, 1994 which designated the United States.

BACKGROUND AND SUMMARY OF THE INVENTION

This invention relates generally to sunroof assemblies for automotive vehicles and specifically to a drive mechanism used to operate a sunroof assembly.

It is common knowledge to provide a single sunroof within a stationary roof of an automotive vehicle. These traditional sunroofs typically employ a transparent glass pane slidable from a covering position, somewhat flush to the roof, to a retracted position, which allows sunlight and ventilation access through an opening within the roof. Another traditional sunroof construction provides a transparent glass pane which is tiltable from a closed position to a pivoted venting position. This allows air from within the vehicle to pass through an opening created between the vented pane and the roof. A single sliding interior sunshade has also been employed with various of these sunroofs. Such sunshade are typically horizontally oriented and slidably movable to expose or cover a sunroof. Exemplary U.S. patents disclosing driving mechanisms for operating these conventional sunroofs are as follows: U.S. Pat. No. 5,069,501 entitled "Spoiler Sunroof Control Mechanism" which issued to Baldwin et al. on Dec. 3, 1991; U.S. Pat. No. 5,026,113 entitled "Sliding and Venting Sunroof" which issued to DiCarlo et al. on Jun. 25, 1991; and U.S. Pat. No. 4,537,442 entitled "Sliding and Tilting Roof for Motor Vehicles" which issued to Jardin on Aug. 27, 1985.

U.S. Pat. No. 4,786,102 entitled "Sun Roof Apparatus of Vehicle Roof" which issued to Sakamoto et al. on Nov. 22, 1988, attempts to further increase the effective roof opening, especially above the front seat, by employing a pair of movable covering panels. This device provides a rear cover panel which is detachably removable such that a front cover panel can be rearwardly slid. Provisions are also made for manually mounting the removed rear cover panel upon the retracted front cover panel. However, this system appears ungainly to operate especially while driving the automobile.

U.S. Pat. No. 5,197,779 entitled "Power Sliding Sunroof" which issued to Mizuno et al. on Mar. 30, 1993, discloses a pair of slidable sunroofs mounted in tracks on top of a stationary roof. However, this non-flush roof system is aesthetically prominent, is prone to excessive wind noise during vehicle driving and will cause excessive aerodynamic drag in all operating positions. It should be noted that conventional driving mechanisms require complicated and delicate lockout mechanisms for dictating desired cam follower and camming slot interactions. For instance, U.S. Pat. No. 5,197,779 requires a swingable hook (54) and U.S. Pat. No. 5,069,501 requires a pivoting stop member (78).

In accordance with the present invention, the preferred embodiment of a drive mechanism for an automotive vehicle sunroof assembly employs a moving cam and a stationary cam, both of which are engaged by a sunroof pane supporting carriage with cam followers. The specific camming surfaces cause the carriage and pane to move between closed, vent and open positions. In another aspect of the present invention a shoe of the carriage is limited to generally horizontal movement along a track. In a further aspect of the present invention, a latch is provided on the moving cam for engagement with a striker movable with the pane. An additional aspect of the present provides an L-shaped camming surface within the stationary cam. In yet another aspect of the present invention, the sunroof drive mechanism employs a pair of sunroofs movable in response to placement of moving cams in relation to stationary cams. In still another embodiment, a H-shaped sunroof tub is used. A method of operating a sunroof assembly is also disclosed.

The sunroof drive mechanism of the present invention provides many advantages over conventional sunroof constructions. For example, the present invention sunroof drive mechanism eliminates the need for the traditional complicated cam lockout mechanism. Thus, the present invention achieves a more robust, cost effective, durable and reliable camming system. Furthermore, various embodiments of the present invention eliminate the need for a costly electronic control unit. Moreover, the sunroof drive mechanism of the present invention provides a less complicated design by removing the need for the many traditional linkages and moving parts. Additional advantages and features of the present invention will become apparent from the following description and appended claims, taken in conjunction with the accompanying drawings.

BRIEF DESCRIPTION OF THE DRAWINGS

FIG. 1 is a rear perspective view showing a dual pane sunroof assembly employing a drive mechanism of the present invention;

FIGS. 2a through 2h are diagrammatic and longitudinal, sectional views, taken along line 2—2 of FIG. 1, showing the various positions of the dual panes employed with the present invention sunroof drive mechanism;

FIG. 6 is a side elevational view showing a carriage employed in the first preferred embodiment sunroof drive mechanism of the present invention;

FIG. 7 is an end elevational view showing the carriage employed in the first preferred embodiment sunroof drive mechanism of the present invention;

FIG. 8 is a side elevational view of a moving cam employed in the first preferred embodiment sunroof drive mechanism of the present invention;

FIG. 9 is a side elevational view showing a stationary cam employed in the first preferred embodiment sunroof drive mechanism of the present invention;

FIG. 10 is a side elevational view showing the first preferred embodiment sunroof drive mechanism of the present invention in a closed position;

FIG. 11 is a side elevational view showing the first preferred embodiment sunroof drive mechanism of the present invention in a vent position;

FIG. 12 is a side elevational view showing the first preferred embodiment sunroof drive mechanism of the present invention in an open position;

FIG. 13 is an exploded perspective view showing a second preferred embodiment of a sunroof drive mechanism of the present invention;

FIG. 16 is a side elevational view showing the second preferred embodiment sunroof drive mechanism of the present invention in a closed position;

FIG. 17 is a side elevational view showing the second preferred embodiment sunroof drive mechanism of the present invention in a vent position;

FIG. 18 is a side elevational view showing the second preferred embodiment sunroof drive mechanism of the present invention in an open position;

DETAILED DESCRIPTION OF THE PREFERRED EMBODIMENT

Figure 3:
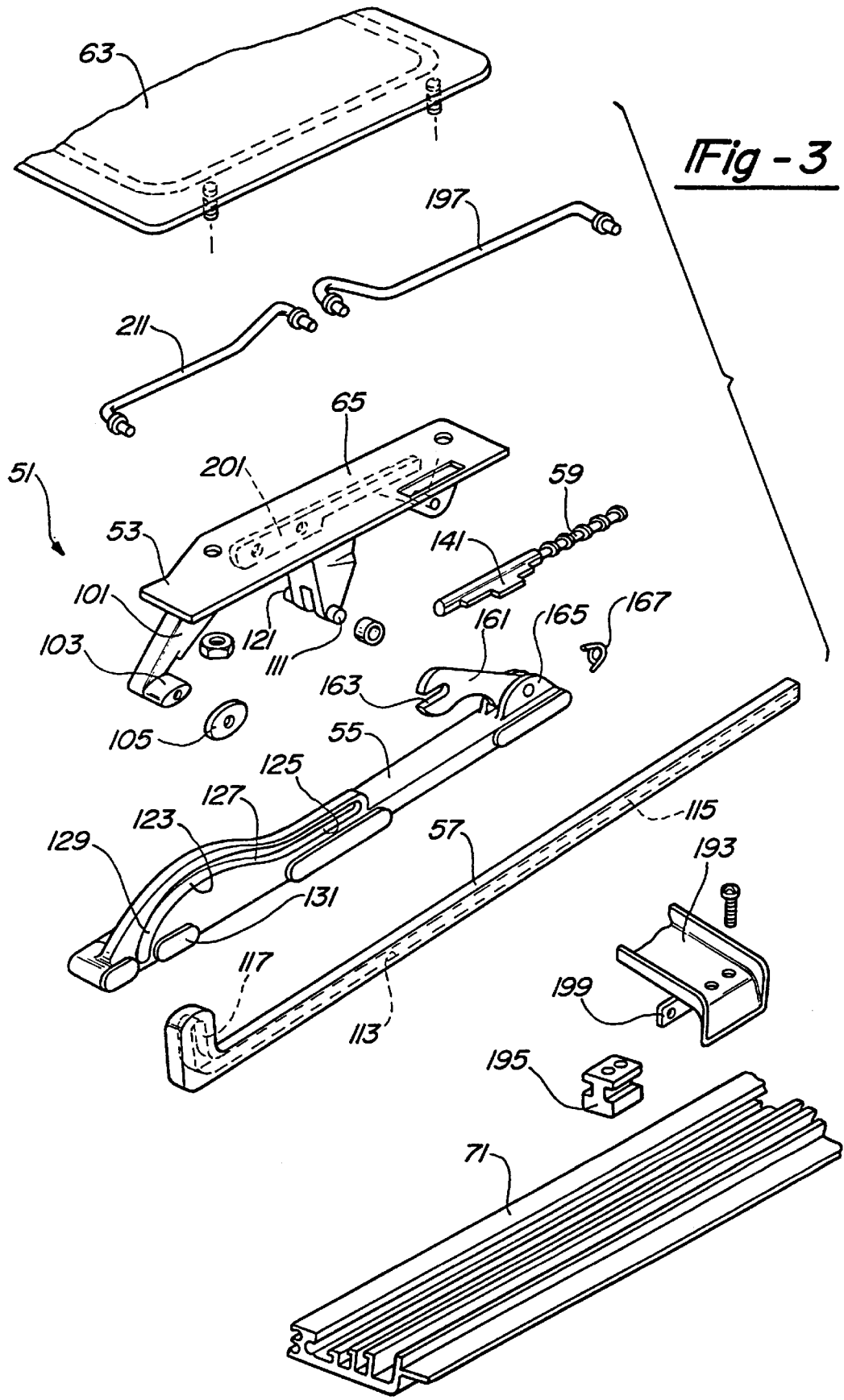
FIG. 3 is an exploded perspective view showing a first preferred embodiment of a sunroof drive mechanism of the present invention.

Referring to FIGS. 1 and 2, a sunroof assembly 31 of the present invention has a front glass sunroof pane 33, a rear glass sunroof pane 35 and a drive mechanism. Sunroof assembly 31 is of a dual pane variety. Thus, both panes 33 and 35 can be opened to retracted or open positions to allow significantly increased sunlight and ventilation access through an opening within a stationary vehicle roof 37. Sunroof assembly 31 is optimally operated by a control system which is, in turn, activated by a conveniently accessible switch assembly.

The various pane positions are as follows. As can best be observed in FIG. 2a, front and rear panes 33 and 35, respectively, are nominally disposed in a covering or closed position substantially flush and sealed to roof 37. Referring to FIG. 2b, rear pane 35 is slideably movable to the open position below an inside surface 39 of roof 37. Rear pane 35 can also be moved to any intermediate position between its closed and open positions. In this operating condition, front pane 33 can be left in its closed position. FIG. 2c shows rear pane 35 left in its closed position while front pane 33 is moved to a partially open position defined by a majority of front pane 33 being angled above a nominal roof plane defined by rear pane 35.

As can be observed in FIG. 2d, front pane 33 is pivoted to a vent position having a rear edge 41 tilted above roof 37.

Rear pane 35 remains in its closed position. FIG. 2e depicts rear pane 35 slidably moved to its open position below roof 37 while front pane 33 is located in its partially open and vent position. FIG. 2f shows both front and rear panes, respectively 33 and 35, pivoted to their vent positions. Referring to FIG. 2g, rear pane 35 is slid to its open position below roof 37 and front pane 33 is in its fully open position substantially above roof 37. This position serves to minimize head room intrusion while allowing maximum roof opening over the front and rear seats. As can be observed in FIG. 2h, front pane 33 remains in its closed position and rear pane 35 is pivoted to its vent position. A drive mechanism, as will be discussed in greater detail hereinafter, can be used to operatively move and retain panes 33 and 35.

Figure 4:
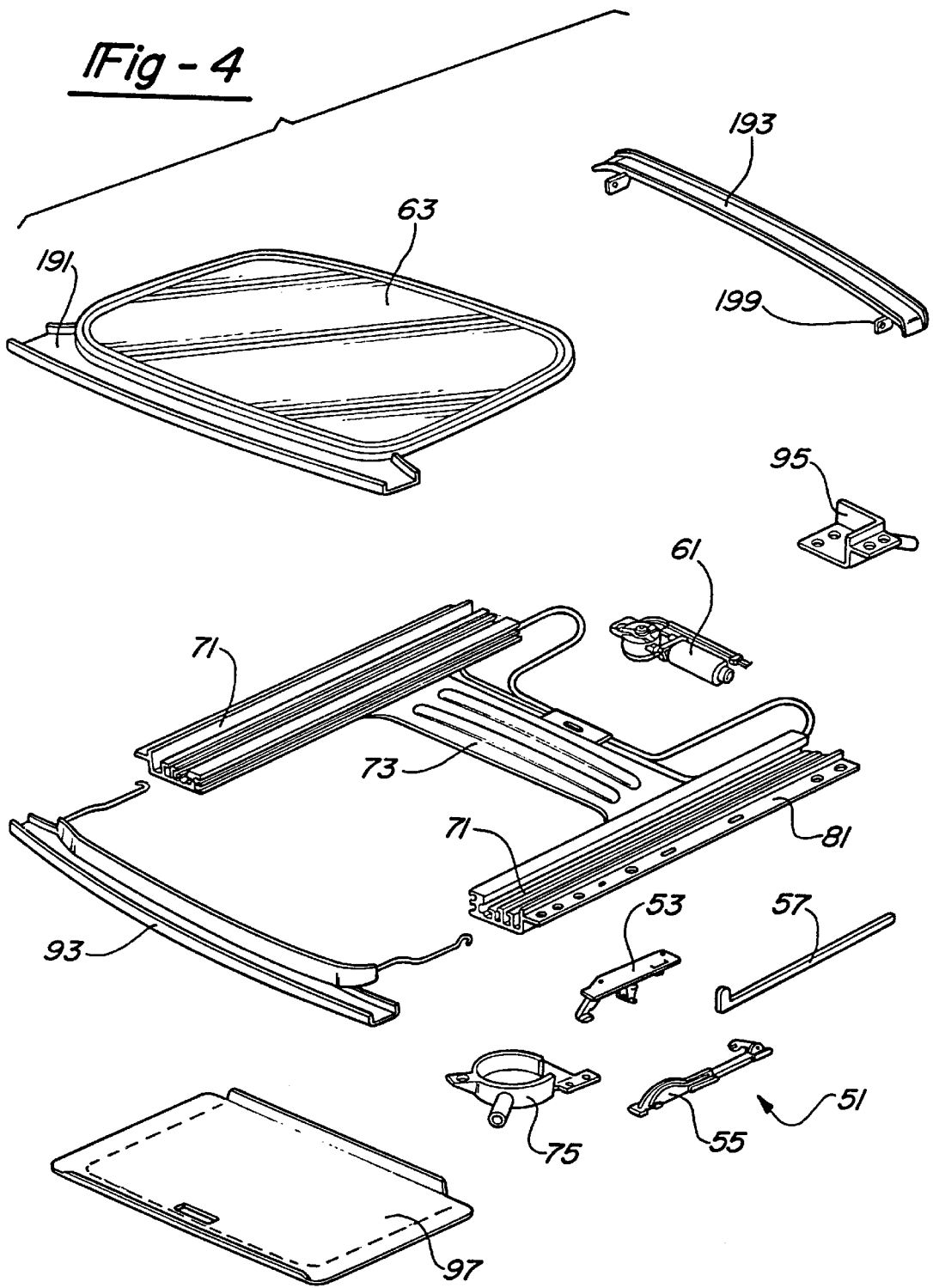
FIG. 4 is an exploded perspective view showing a single pane sunroof assembly in combination with the first preferred embodiment sunroof drive mechanism of the present invention.
Figure 5:
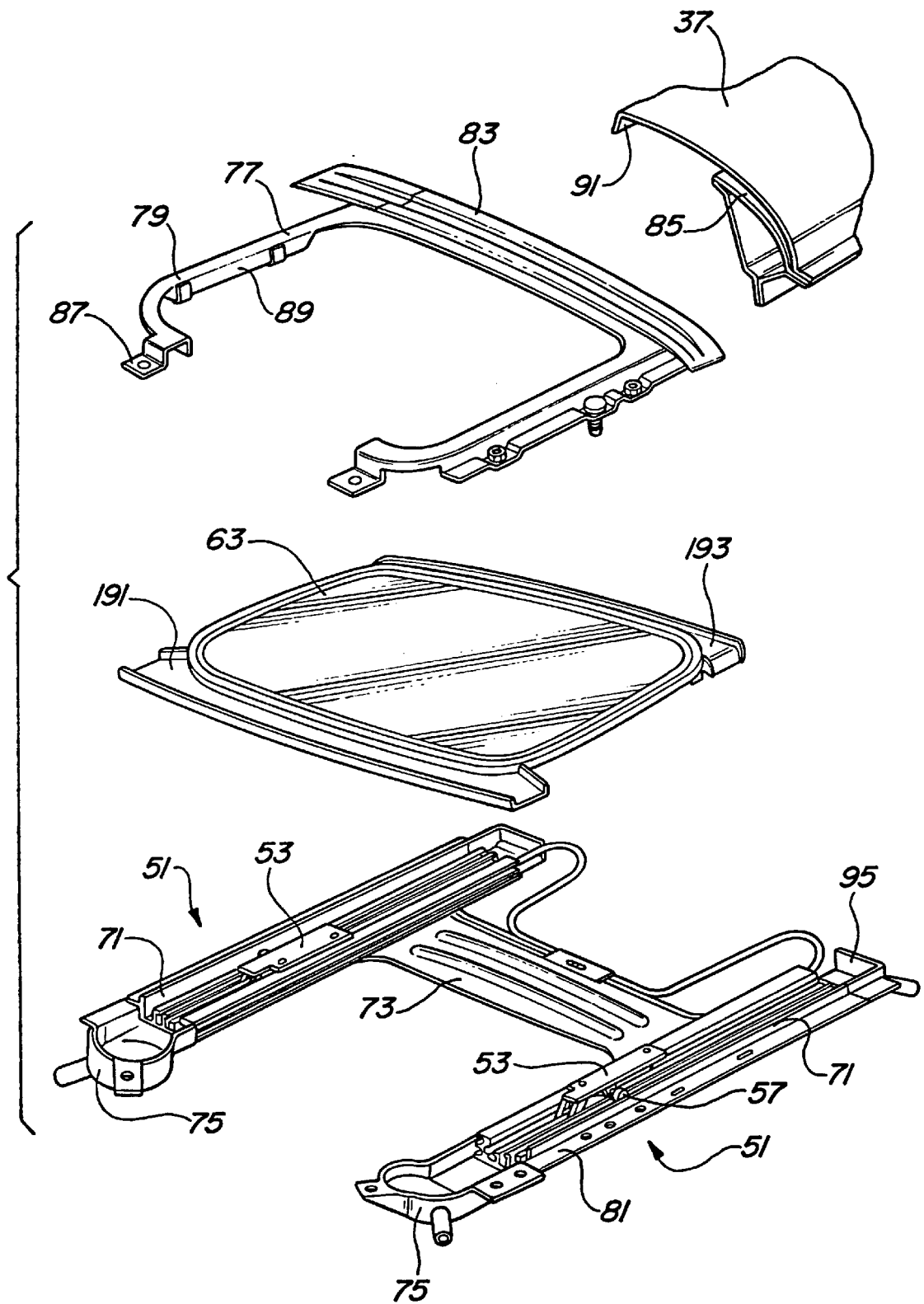
FIG. 5 is a partially exploded perspective view showing a single pane sunroof assembly in combination with the first preferred embodiment sunroof drive mechanism of the present invention.

Referring to FIGS. 3 through 5, a first preferred embodiment of each sunroof drive mechanism 51 includes a carriage 53, a moving cam 55, a stationary cam 57, a driving cable 59, and a fractional horsepower dc motor or actuator 61. A reaction injection molded or polyvinyl chloride encapsulated glass sunroof pane 63 is securely fastened upon a pane supporting segment 65 of carriage 63. Pane 63 can be used in a single sunroof unit, as shown in FIGS. 4 and 5, or may be employed as a rear sunroof pane (e.g., 35) in a dual sunroof construction as shown in FIGS. 1 and 2.

Returning again to FIGS. 3 through 5, a sunroof tub includes a pair of tracks 71 running in a generally horizontal, fore and aft manner. The sunroof tub further includes a crossbar structure 73, coupling tracks 71, a pair of drain caps 75 secured and sealed to front ends of tracks 71, and an upper frame 77. Upper frame 77 has C-shaped arms 79 attached to flanges 81 of tracks 71 and has a cross car brace 83 with ends welded to side rail panels 85. Furthermore, flanges 87 of c-shaped arms 79 are bolted to caps 75. Inner surfaces 89 of c-shaped arms 87 are welded to downwardly bent flanges 91 of stationary roof 37. Either a separate movable front wind deflection/drain trough 93 may be attached to each track 71 or an integrated drain trough 191 is molded with the encapsulating material onto pane 63. The separate wind deflection/drain trough 93 is preferably employed with the H-shaped tub while the integrated drain trough 191 is used with a conventional two or three cross member tub. The separate wind deflection/drain trough 93 is attached to screws in each track 71 by J-shaped spring arms. Separate wind deflection/drain trough 93, which is injection molded from plastic, flexibly moves up and down; closing movement of pane 63 pushes it down while a stationary roof flange serves as an up stop. Moreover, drain brackets 95 are affixed and sealed to each rearward end of tracks 71. Motor 61 is mounted to crossbar structure or member 73. Thus, the sunroof tub has an H-shaped configuration thereby providing for a lighter weight and less costly sunroof structure. In fact, over six pounds are reduced over traditional two or three cross-member designs. This H-shaped sunroof tub additionally allows for shorter fore and aft tracks which lead to easier vehicle packaging and material savings. The panel hangs partially behind the rear ends of the tracks when fully opened. The length is thereby decreased approximately b 25%. The tracks are extruded from aluminum, the cross bar structure is stamped steel and the drain caps are injection molded from glass filled nylon. A rigid sunshade 97 is also slideably disposed against tracks 71. Of course, the conventional two or three cross-member, sunroof tub construction can also be employed with the drive mechanism of the present invention.

A leg 101 projects from a forward portion of pane supporting segment 65 of carriage 53 from which a pair of shoes (preferably like those of FIG. 13) pivotally extend in a transverse manner. Alternately, the illustrated shoe 103 and bushing 105 can be used. The shoes are linearly slidable along track 71. Alternately, an auxiliary linkage may couple the shoes to track 71 if vertical or arcuate movement is desired independent of track 71.

A first cam follower 111 transversely projects from a tab downwardly extending from a middle portion of pane supporting segment 65. First cam follower 111 has a cylindrical configuration which slidably rides along a camming surface 113 defining a generally uniform slot within stationary cam 57. Camming surface 113 of stationary cam 57 includes a generally horizontal section 115 running parallel to track 71, and a somewhat vertical section 117 extending from a forward end thereof. Alternately, horizontal section 115 may be slightly inclining or declining while vertical segment 117 may have a portion extending below as well as above horizontal section 115. Furthermore, it is also envisioned that an alternate embodiment of vertical section 117 may have a variety of arcuate shapes which generally extend in a vertical manner.

A second cylindrical cam follower 121 also transversely projects from the tab of carriage 53 for engaging with a camming surface 123 of moving cam 55. Camming surface 123 also defines a uniform camming slot within moving cam 55. Camming surface 123 of moving cam 55 includes a generally horizontal section 125, a forwardly inclining section 127 and a forwardly inclining forwardmost section 129. Moving cam 55 further has a set of transversely extending feet 131 which engage within track 71 thereby allowing moving cam 55 to slide in a linear fore and aft direction therealong in response to pushing and pulling of motor driven cable 59.

Each cable 59 is of a conventional variety having a twisted helical wire wrapped around a flocked and greased cable which rides within a partially cylindrical channel of track 71. Motor 61 has an output pinion gear which drivably engages the helical wire and flocking of each cable 59. A set of run out and entry tubes are also provided. A plastic key 141 is molded onto an end of cable 59 for causing interlocking engagement with a receptacle in moving cam 55.

A claw like latch 161 has a bifurcated distal end defining an engagement surface 163. Latch 161 further has a proximal end pivotally joined between a pair of flanges 165 upstanding from moving cam 55. A spring 167 interfaces with latch 161 and moving cam 55 thereby serving to upwardly bias latch 161 away therefrom. As can best be observed in FIGS. 3, 6, 7 and 10, a striker 171 transversely extends from pane supporting segment 65 of carriage 53. Striker 171 has a substantially cylindrical configuration for engagement by engaging surface 163 of latch 161 when pane 63 and carriage 53 are disposed in a closed position, as shown in FIG. 10. This interaction between striker 171 and latch 161 significantly reduces pane bobbling or vibration due to air pressure buildup within the vehicle passenger compartment when doors are shut or the HVAC system is actuated.

Referring now to FIGS. 3 through 5, a separate rear drain trough 193 is coupled for movement to tracks 71 by slide blocks 195 secured thereto. Rigid rods 197 are pivotally coupled between forward facing flanges 199 and an aperture within a fore and aft oriented rib 201 of each carriage 53. A forward coupling rod 211 is also coupled to rib 201 if a forward pane is employed for use in a dual sunroof system.

The operation of the first preferred embodiment sunroof drive mechanism in shown in FIGS. 10 through 12. With reference to FIG. 10, the first cam follower is positioned along a medial portion of the stationary cam's vertical section and the second cam follower is positioned along the horizontal section of the moving cam when the carriage and pane are disposed in a closed position 221. FIG. 11 illustrates the first cam follower positioned adjacent an upper end of the stationary cam's vertical section. Concurrently, the second cam follower is positioned at an intersection or peak between the ramp section and forward section of the moving cam. Accordingly, the carriage and pane are disposed in a vent position 223. This vent position allows for a significant gap and the coincidental airflow between a rearmost portion of the pane and the adjacent stationary roof. This should be distinguished from a fully opened position wherein a pane can be at least partially stowed above a roof plane as will be discussed hereinafter with regard to other sunroof drive mechanism embodiments. Referring to FIG. 12, the first cam follower is positioned along a rearmost section of the stationary cam's horizontal section while the second cam follower is positioned adjacent to a forwardmost portion of the moving cam's forward section, thus causing the carriage and pane to be disposed in a fully open position 225 below the stationary roof 37.

A second preferred embodiment of the sunroof drive mechanism 51 of the present invention is shown in FIGS. 13 through 18. A stationary cam 301 and a carriage 303 are configured predominately the same as those disclosed with the first preferred embodiment with the exception of a pair of pivoting shoes 305 engaging a forward leg 307 of carriage 303 and with the exception of a striker 309. However, a moving cam 321 has a camming surface defined by a forward section 323 declining from a forward end of a ramp section 325. The camming surface is further defined by a nominal horizontal surface 327 with an upwardly sloping section 329 inclining from a rear end of nominal horizontal section 327. The camming surface also has a trailing generally horizontal section 331 extending rearward from the uppermost portion of sloping section 329. Thus, FIG. 16 shows a first cam follower 341 positioned along a medial portion of the stationary cam's vertical section while a second cam follower 343 is positioned along the nominal horizontal section of the moving cam when the carriage and pane are disposed in a closed position 345. At this position, a horizontally and transversely oriented shelf 351 projecting from an upper portion of a vertical wall 353 of a latch 355 engages L-shaped striker 309. A base 357 of latch 355 is mounted to moving cam 321 by four snap fits 359 and upwardly biased by a compression spring 361. Of course, a leaf spring or elastomeric member could alternately provide the biasing action.

Figure 14:
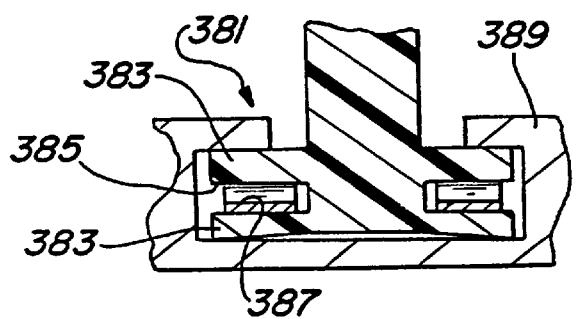
FIG. 14 is a cross sectional view, taken along line 14—14 of FIG. 13, showing moving cam feet employed in the second preferred embodiment sunroof drive mechanism of the present invention.
Figure 15:
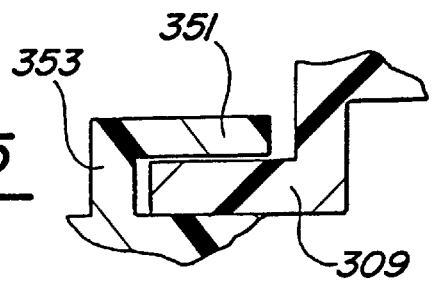
FIG. 15 is a cross sectional view, taken along line 15—15 of FIG. 13, showing a portion of a latch and striker employed within the second preferred embodiment sunroof drive mechanism of the present invention.
Figure 19:
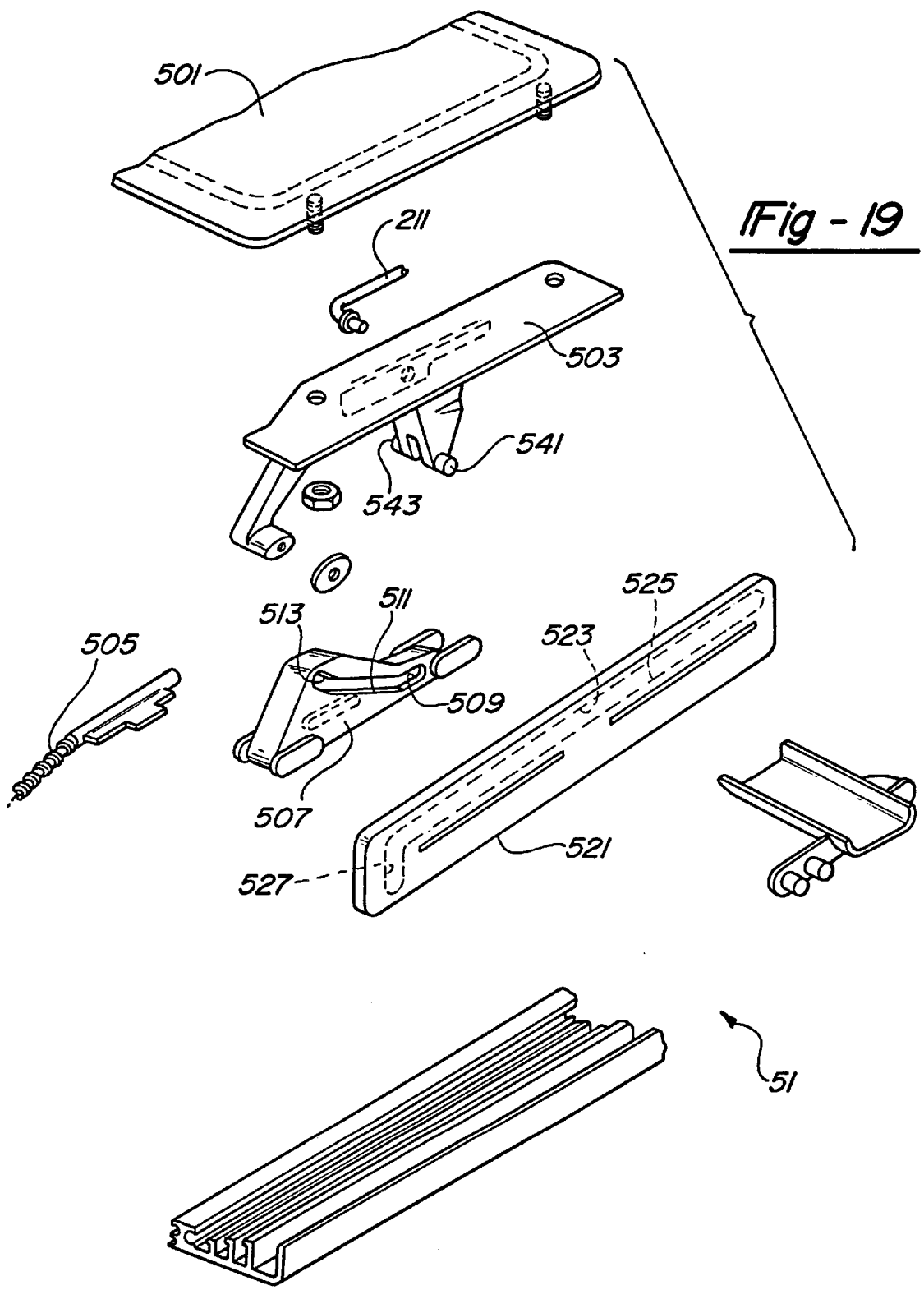
FIG. 19 is an exploded perspective view showing a third preferred embodiment of a sunroof drive mechanism of the present invention.
Figure 20:
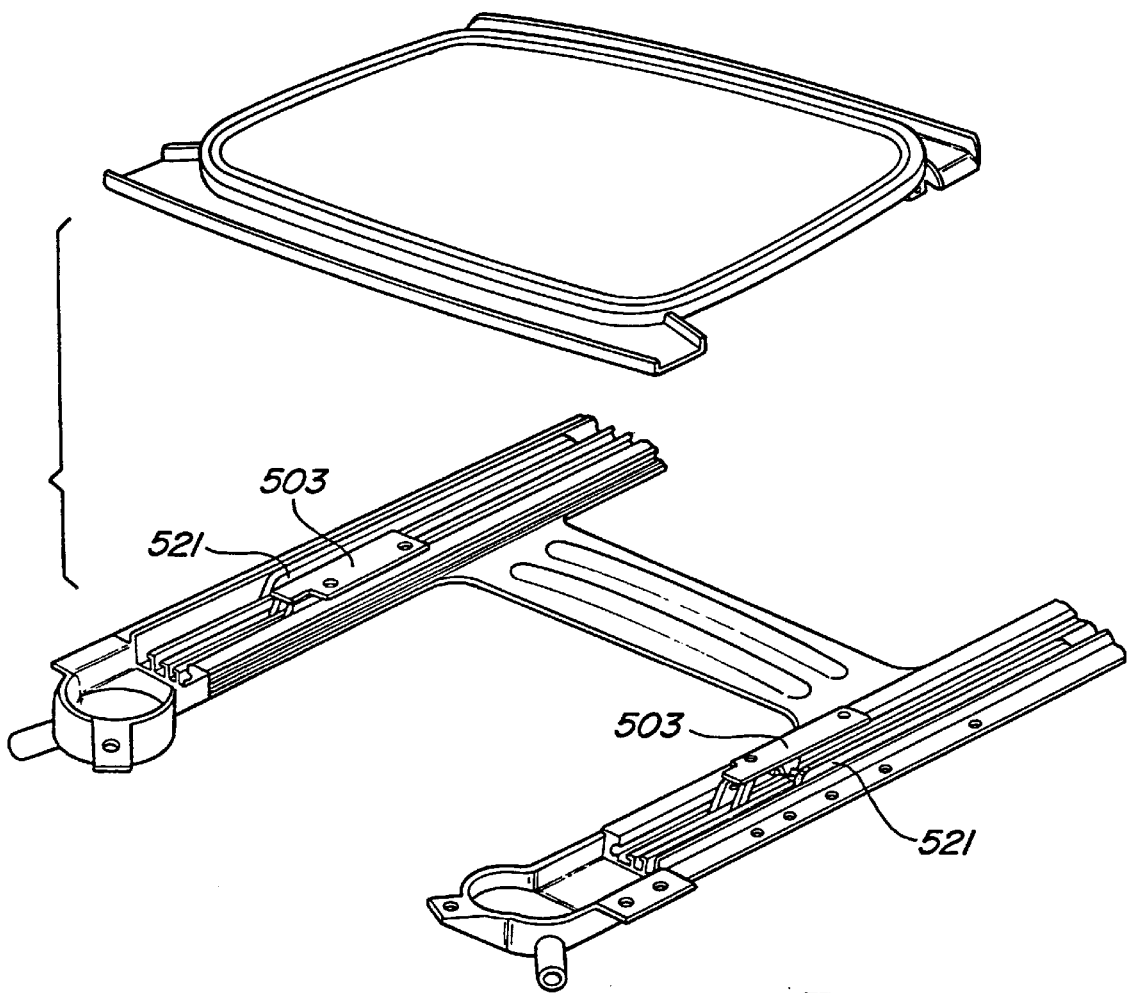
FIG. 20 is a partially exploded perspective view showing the third preferred embodiment of a sunroof drive mechanism of the present invention.

As can be observed in FIGS. 13 and 14, a set of transversely projecting feet 381 each have a pair of fore and aft oriented walls 383 separated by a horizontally open slot 385. A leaf spring 387 or other elastic members such as compression springs, flexible plastic fingers or elastomeric materials serve to outwardly bias walls 383 away from each other. This encourages a tight sliding fit between feet 381 and the adjacent track channel 389. Thus, the potential for annoying rattles and cam follower misalignment is reduced.

FIG. 17 shows the first cam follower positioned adjacent an upper end of the stationary cam's vertical section while the second cam follower is positioned along the trailing horizontal section of the moving cam. This causes the carriage and pane to be disposed in a vent position 371. In reaching this position, latch 355 has been slid forward past striker 309 in concert with movement of the moving cam. Referring to now to FIG. 18, the first cam follower is positioned along the horizontal section of the stationary cam while the second cam follower is positioned adjacent a forwardmost portion of the moving cam's forward section thereby causing the carriage and panes to be disposed in an open position 373 below the stationary roof. Latch 355 has been slid rearward past striker 309.

The second preferred embodiment is also intended to be applied to a single sunroof pane construction or alternately, a rear pane of a dual sunroof system. Furthermore, while the first preferred embodiment drive mechanism is more suited to an inexpensive vehicle due to its economical construction, partially due to the lack of an electronic control unit, this second preferred embodiment drive mechanism is better suited to a luxury type vehicle wherein the pane can be directly moved from a closed position to an open position and back again without going through the venting position therebetween as performed in the first embodiment. However, with this second preferred embodiment, an electronic control unit and hall effect sensor are preferably used to directly or indirectly determine the interface between the cam follower and the nominal horizontal camming surface section, congruent with the closed position, and thereby de-energize the motor. Such a hall effect sensor is disclosed within U.S. Pat. No. 4,835,449 entitled "Sliding Roof Panel Control Apparatus" which issued to Huehn on May 30, 1989, and assigned to assignee of the present invention. This patent is incorporated by reference herewithin. The electronic control unit can be of a conventional analog solid state variety or use a microprocessor architecture.

A third preferred embodiment sunroof drive mechanism 51 is disclosed in FIGS. 19 through 23. This embodiment is intended for use in moving a front sunroof pane 501 of a dual sunroof construction or can alternately be used to operate a single sunroof pane. This embodiment preferably employs a carriage 503 and cable 505 substantially identical to that employed with the second preferred embodiment, although the carriage of the first preferred embodiment can also be incorporated as is shown; however, a striker is not provided herewith. Furthermore, cable 505 is coupled to a second electric motor which can be synchronously and/or independently operated from the rear pane and rear pane motor.

Within this third exemplary embodiment, a moving cam 507 has a camming surface defined by a horizontal section 509, a ramp section 511 and a forwardmost section 513 inclined steeper than ramp section 511. Acting in concert therewith, a stationary cam 521 is provided with an L-shaped camming surface 523 defined by a somewhat horizontal section 525 and generally vertical forward section 527.

Figure 21:
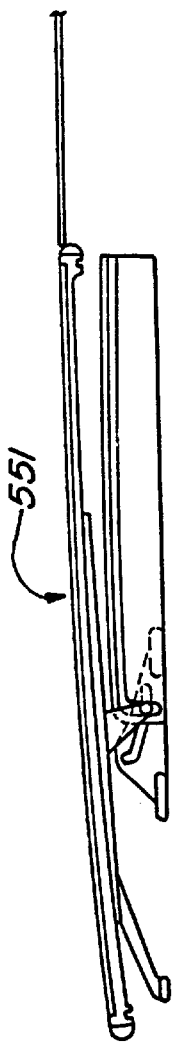
FIG. 21 is a side elevational view showing the third preferred embodiment sunroof drive mechanism of the present invention in a closed position.
Figure 22:
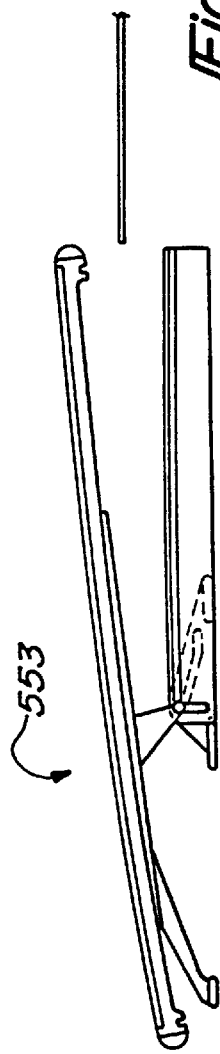
FIG. 22 is a side elevational view showing the third preferred embodiment sunroof drive mechanism of the present invention in a vent position.
Figure 23:
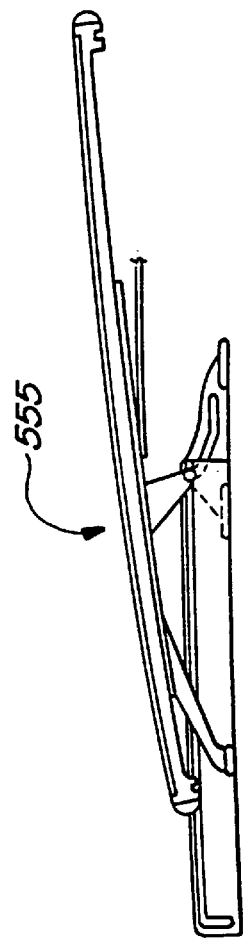
FIG. 23 is a side elevational view showing the third preferred embodiment sunroof drive mechanism of the present invention in an open position.

As can be seen in FIG. 21, a first cam follower 541 is positioned along a lower portion of the stationary cam's vertical section while a second cam follower 543 is positioned along the nominal horizontal section of the moving cam when the carriage and pane are disposed in a closed position 551. FIG. 22 illustrates the first cam follower positioned adjacent an uppermost portion of the stationary cam's vertical section while the second cam follower is positioned adjacent a forwardmost portion of the moving cam's forward section; thus, the carriage and pane are disposed in a vent position 553. Now referring to FIG. 23, the first cam follower is disposed along a rear portion of the stationary cam's horizontal section while the second cam follower is positioned adjacent a forwardmost portion of the moving cam's forward section; accordingly, the carriage and pane are disposed in an open position 555 with a rear part of the pane oriented above a rear sunroof pane or stationary roof.

The present invention sunroof drive mechanisms are significantly more cost effective and durable than prior constructions. For example, it has been found that when a pushout test is conducted with a uniform load, it takes approximately 400 pounds of upward force vertically pressing outwardly from an inner surface along one side of a pane to significantly displace the pane from the first preferred embodiment drive mechanism of the present invention to reach failure. This should be compared to a maximum of approximately 230–240 pounds for a similar push out failure mode in a conventional device. This improvement is at least partially due to a reduction in parts, thereby allowing a size increase in each part. Additionally, it is envisioned that the cams and carriages of the present invention embodiments shall be cast and/or machined from aluminum, however, a mineral filled engineering polymer may also be found suitable.

While the preferred embodiments of this sunroof drive mechanism have been disclosed, it will be appreciated that various modifications may be made without departing from the present invention. For example, any of the aforementioned cam or latch embodiments can be used for a single sunroof pane, dual sunroof front pane and/or dual sunroof rear pane constructions. Furthermore, the disclosed stationary cam may move in addition to or instead of movement of the disclosed moving cam. Various materials and components have been disclosed in an exemplary fashion, however, a variety of other materials, component combinations and linkages may of course be employed. It is intended by the following claims to cover these and any other departures from the disclosed embodiments which fall within the true spirit of this invention.

The invention claimed is:

1. A sunroof assembly for use in an automotive vehicle, said sunroof assembly comprising:
   a pair of tracks;
   a single elongated cross structure permanently, rigidly and stationarily securing said pair of tracks to each other prior to installation in said vehicle, said pair of tracks and said cross structure defining an H-shaped configuration;
   end caps each having a wall defining a substantially closed surface extending from a respective track and a drainage area, each of said end caps attaching to a respective end of each of said pair of tracks; and
   an electric motor mounted to said cross member.

2. The sunroof assembly of claim 1 wherein said end caps are mounted upon forward ends of said pair of tracks and independently drain water.

3. The sunroof assembly of claim 2 further comprising independent water draining end members mounted upon a rearward end of each track.

4. The sunroof assembly of claim 1 further comprising an upper frame having a pair of substantially C-shaped arms extending from a cross car brace, said cross structure including said cross car brace, said arms being affixed to said pair of tracks.

5. The sunroof assembly of claim 4 further comprising a stationary roof assembly wherein said cross car brace and said arms are affixed to said stationary roof assembly.

6. The sunroof assembly of claim 4 wherein said cross car brace extends cross car past an outermost portion of said arms, said cross structure further including a cross bar, said cross car brace being mounted directly above said cross bar.

7. The sunroof assembly of claim 1 further comprising a moving cam and a stationary cam disposed in each of said pair of tracks.

8. The sunroof assembly of claim 1 further comprising a substantially horizontal sunroof panel moveable between at least open and closed positions, a movement mechanism attached to each of said tracks operably serving to move said panel, said cross structure and said motor being located substantially central to the fore-and-aft direction of said tracks.

9. A sunroof assembly for use in an automotive vehicle, said sunroof assembly comprising:

a pair of tracks;

a single elongated cross structure stationarily securing and spanning between said pair of tracks;

said pair of tracks and said cross member having an H-shaped configuration; and an independent water draining end cap mounted upon a forward end of each of said tracks, water being substantially prevented from flowing between said forward end caps, each of said end caps having a wall defining a substantially closed area extending from a respective track and a drainage area.

10. The sunroof assembly of claim 9 wherein each of said end caps have a partially circular top view.

11. The sunroof assembly of claim 9 further comprising an independent water draining end member mounted upon a rear end of each said tracks.

12. A sunroof assembly for use in an automotive vehicle, said sunroof assembly comprising:

a pair of tracks;

end caps each having a wall defining a substantially closed surface extending from a respective track and a drainage area, each of said end caps attaching to a respective end of each of said pair of tracks;

a single cross structure spanning between said pair of tracks, said cross structure being substantially centrally located relative to said tracks in a fore-and-aft direction;

a moving cam coupled to one of said tracks and having a camming surface including a ramp section and a substantially horizontal section;

a panel movable between a closed position, an open position and a vent position;

a moving cam follower riding along said camming surface of said moving cam, said moving cam follower being positioned along said first substantially horizontal section of said moving camming surface when said panel is disposed in said closed position;

a stationary cam having a camming surface including a substantially horizontal section and a substantially vertical section extending upwardly from an end of said substantially horizontal section;

a second cam follower engaging said stationary camming surface; and an actuator mounted to said cross structure and operably serving to move said moving cam.

13. The sunroof assembly of claim 12 wherein said pair of tracks and said cross structure have an H-shaped configuration, ends of said tracks being free from each other prior to installation in said vehicle.

14. The sunroof assembly of claim 13 wherein said actuator includes an electric motor and cables operably driven by said motor, at least a majority of said cables are located rearward of said cross member.

15. The sunroof assembly of claim 12 wherein at least two of said water draining end caps, each of which are mounted upon a forward end of each track, substantially prevent water from flowing between said tracks at said forward end.

16. The sunroof assembly of claim 15 further comprising an independent water draining end member mounted upon a rearward end of each track.

17. The sunroof assembly of claim 12 further comprising an upper frame having a pair of substantially C-shaped arms extending from a cross car brace, said arms affixed to said pair of tracks.

18. The sunroof assembly of claim 12 further comprising a latch removably coupling said panel to said moving cam when said panel is in said closed position.

19. The sunroof assembly of claim 1 wherein said tracks are only structurally connected to each other at a substantially central fore and aft location inwardly spaced from said ends of said tracks, prior to installation in said vehicle and prior to installation of a substantially flat and movable sunroof panel.

* * * * *

UNITED STATES PATENT AND TRADEMARK OFFICE
CERTIFICATE OF CORRECTION

PATENT NO. : 5,941,598
DATED : August 24, 1999
INVENTOR(S) : Cave et al

It is certified that error appears in the above-identified patent and that said Letters Patent is hereby corrected as shown below:

Column 8, line 42, "attaching" should be --being attached--.

Column 9, line 20, "have" should be --has--.

Column 9, line 29, "attaching" should be --being attached--.

Column 10, line 21, "are" should be --is--.

Column 10, line 35, "only" should be deleted and --only-- inserted after "other".

Signed and Sealed this

Twenty-seventh Day of June, 2000

*Attest:*

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,941,598
DATED : August 24, 1999
INVENTOR(S) : Mark A. Caye et al

It is certified that error appears in the above-identified patent and that said Letters Patent is hereby corrected as shown below:

On the title page under Inventors, "Cave" should be -- Caye --.

Column 2, line 8, after "present" insert -- invention --.

Column 3, line 39, ";" should be -- . --.

Column 4, line 57, delete "b".

Column 5, line 66, "in" (first occurrence) should be -- is --.

Column 6, line 66, delete "to" (first occurrence).

Column 8, line 42, "attaching" should be -- being attached --.

Column 9, line 21, "have" should be -- has --.

UNITED STATES PATENT AND TRADEMARK OFFICE
CERTIFICATE OF CORRECTION

PATENT NO. : 5,941,598
DATED : August 24, 1999
INVENTOR(S) : Mark A. Caye et al

It is certified that error appears in the above-identified patent and that said Letters Patent is hereby corrected as shown below:

Column 9, line 30, "attaching" should be -- being attached --.

Column 10, line 23, "are" should be -- is --.

Column 10, line 37, delete "only".

Column 10, line 37, after "other" insert -- only --.

This certificate supersedes Certificate of Correction issued June 27, 2000.

Signed and Sealed this

Fourteenth Day of November, 2000

*Attest:*

Q. TODD DICKINSON

*Attesting Officer*     *Director of Patents and Trademarks*